(12) United States Patent
Pignataro et al.

(10) Patent No.: US 9,525,589 B2
(45) Date of Patent: Dec. 20, 2016

(54) PROACTIVE M2M FRAMEWORK USING DEVICE-LEVEL VCARD FOR INVENTORY, IDENTITY, AND NETWORK MANAGEMENT

(71) Applicant: Cisco Technology, Inc., San Jose, CA (US)

(72) Inventors: Carlos M. Pignataro, Raleigh, NC (US); Gonzalo Salgueiro, Raleigh, NC (US); Joseph Michael Clarke, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 867 days.

(21) Appl. No.: 13/716,519

(22) Filed: Dec. 17, 2012

(65) Prior Publication Data

US 2014/0173073 A1    Jun. 19, 2014

(51) Int. Cl.
| | | |
|---|---|---|
| G06F 15/173 | (2006.01) | |
| G06F 3/0481 | (2013.01) | |
| H04L 12/24 | (2006.01) | |
| H04L 29/12 | (2006.01) | |

(52) U.S. Cl.
CPC ....... *H04L 41/0266* (2013.01); *H04L 61/1594* (2013.01)

(58) Field of Classification Search
CPC .. H04L 41/00; H04L 41/0213; H04L 41/0233; H04L 41/0266; H04L 41/08; H04L 41/0816; H04L 41/0853; H04L 61/00; H04L 61/01594; G06F 17/24
USPC .......... 709/223; 370/351, 392, 401; 715/765
See application file for complete search history.

(56) References Cited

U.S. PATENT DOCUMENTS

| | | | | |
|---|---|---|---|---|
| 6,226,679 B1* | 5/2001 | Gupta | ................. | H04L 41/0213 709/224 |
| 6,636,742 B1* | 10/2003 | Torkki | .................. | H04W 60/00 455/433 |
| 6,934,749 B1* | 8/2005 | Black | ........................ | G06F 1/14 709/217 |
| 7,693,976 B2* | 4/2010 | Perry | .................... | H04L 7/0008 340/1.1 |
| 7,925,620 B1* | 4/2011 | Yoon | .................... | G06Q 10/109 707/609 |
| 2003/0020977 A1* | 1/2003 | Smith | ................. | H04J 14/0283 398/5 |
| 2004/0059811 A1* | 3/2004 | Sugauchi | ............ | H04L 41/0853 709/224 |
| 2004/0186694 A1* | 9/2004 | Oya | .................... | G03G 15/5075 702/188 |
| 2005/0054326 A1* | 3/2005 | Rogers | ................ | H04L 63/1408 455/410 |
| 2005/0198247 A1* | 9/2005 | Perry | .................... | H04L 7/0008 709/223 |

(Continued)

*Primary Examiner* — Viet Vu
*Assistant Examiner* — Michael A Chambers
(74) *Attorney, Agent, or Firm* — Merchant & Gould P.C.

(57) ABSTRACT

A network device may connect to a smart-enabled network. Once connected, the network device may receive a network address for a network management server (NMS). Having the network address for the NMS, the network device may generate a vCard comprising the attributes necessary for registering with the NMS. The network device may then communicate the vCard to the NMS. The NMS may then be configured to identify, register, and add the network device to a directory.

19 Claims, 3 Drawing Sheets

(56) References Cited

U.S. PATENT DOCUMENTS

| | | | | |
|---|---|---|---|---|
| 2005/0213560 A1* | 9/2005 | Duvvury | H04L 29/12292 | 370/351 |
| 2005/0289474 A1* | 12/2005 | Master | G06F 3/0481 | 715/765 |
| 2006/0236325 A1* | 10/2006 | Rao | G06F 8/65 | 719/315 |
| 2007/0202881 A1* | 8/2007 | Dervan | G06Q 30/02 | 455/450 |
| 2008/0259922 A1* | 10/2008 | White | H04L 41/082 | 370/392 |
| 2009/0049161 A1* | 2/2009 | Takeuchi | H04L 12/24 | 709/222 |
| 2009/0204699 A1* | 8/2009 | Kortright | H04L 41/082 | 709/223 |
| 2010/0199089 A1* | 8/2010 | Vysogorets | G06F 21/34 | 713/168 |
| 2011/0202350 A1* | 8/2011 | Barnes | H04M 3/4938 | 704/270.1 |
| 2012/0066517 A1* | 3/2012 | Vysogorets | G06F 21/34 | 713/193 |
| 2012/0066752 A1* | 3/2012 | Vysogorets | G06F 21/34 | 726/7 |
| 2012/0066756 A1* | 3/2012 | Vysogorets | G06F 21/34 | 726/9 |
| 2012/0066757 A1* | 3/2012 | Vysogorets | G06F 21/34 | 726/9 |
| 2013/0091180 A1* | 4/2013 | Vicat-Blanc-Primet | H04L 41/0816 | 707/803 |
| 2013/0132546 A1* | 5/2013 | Vicat-Blanc Primet | H04L 41/0816 | 709/223 |
| 2013/0145148 A1* | 6/2013 | Shablygin | H04L 63/0853 | 713/155 |
| 2013/0145172 A1* | 6/2013 | Shablygin | G06F 21/33 | 713/185 |
| 2013/0145173 A1* | 6/2013 | Shablygin | G06F 21/34 | 713/185 |
| 2013/0179508 A1* | 7/2013 | Matoba | H04W 8/18 | 709/204 |
| 2013/0208893 A1* | 8/2013 | Shablygin | H04L 9/0822 | 380/277 |
| 2013/0212704 A1* | 8/2013 | Shablygin | G06F 21/6218 | 726/28 |
| 2013/0275543 A1* | 10/2013 | Jain | G06F 15/167 | 709/213 |
| 2014/0025676 A1* | 1/2014 | Alexander | G06Q 10/10 | 707/736 |
| 2014/0181009 A1* | 6/2014 | Alexander | G06Q 10/00 | 707/609 |

* cited by examiner

```
<?xml version="1.0"?>
<vcard xmlns="urn:ietf:params:xml:ns:vcard-4.0">
  <kind>
    <text>device</text>
  </kind>
  <fn>
    <text>RTR-2</text>
  </fn>
  <mgmt-ip xmlns="http://www.cisco.com/vcard/mgmt-ip">10.12.1.2</mgmt-ip>
  <geo>
    <uri>35.99,-78.90</uri>
  </geo>
  <sys-object-id xmlns="http://www.cisco.com/vcard/sys-object-id">1.3.6.1.4.1.9.1.1</sys-object-id>
  <serial-number xmlns="http://www.cisco.com/vcard/serial-number">1024101</serial-number>
  <adr>
    <pobox/>
    <ext>Aisle 6 / Rack 26</ext>
    <street>7200-12 Kit Creek Rd</street>
    <locality>RTP</locality>
    <region>NC</region>
    <code>27709</code>
    <country>USA</country>
  </adr>
  <contact-email xmlns="http://www.cisco.com/vcard/contact-email">jclarke@cisco.com</contact-email>
  <contact-tel xmlns="https://www.cisco.com/vcard/contact-tel">+1-919-392-2867</contact-tel>
  <snmp-ro-comm xmlns="http://www.cisco.com/vcard/snmp-ro-comm">public</snmp-ro-comm>
  <snmp-rw-comm xmlns="http://www.cisco.com/vcard/snmp-rw-comm">private</snmp-rw-comm>
  <contract-number xmlns="http://www.cisco.com/vcard/contract-number">123456</contract-number>
</vcard>
```

FIG. 4

PROACTIVE M2M FRAMEWORK USING DEVICE-LEVEL VCARD FOR INVENTORY, IDENTITY, AND NETWORK MANAGEMENT

TECHNICAL FIELD

The present disclosure relates generally to network management.

BACKGROUND

Gathering a comprehensive list of network devices in order to manage them (i.e., collect inventory, configure, and fault data) is a challenging task. For instance, network administrators may need to either know all of the devices in a network or do a sweeping discovery to locate all of the devices. This sweeping discovery may put a strain on the network and may not locate all of the devices. Furthermore, the discovery process may need to be repeated for every new device connected to the network.

Additionally, credentials (e.g., SNMP community strings, CLI passwords) should be known for all devices found during discovery or added manually to a network management system. In many instances, not all of the devices in a network use the same credentials, forcing network administrators to track down their accurate values. Finally, there are device attributes (e.g., asset tracking and support information) that cannot be easily polled from devices, if at all.

BRIEF DESCRIPTION OF THE DRAWINGS

The accompanying drawings, which are incorporated in and constitute a part of this disclosure, illustrate various embodiments of the present disclosure. In the drawings:

FIG. 4 is one example of a vCard.

DETAILED DESCRIPTION OF EXAMPLE EMBODIMENTS

Overview

Figure 1:
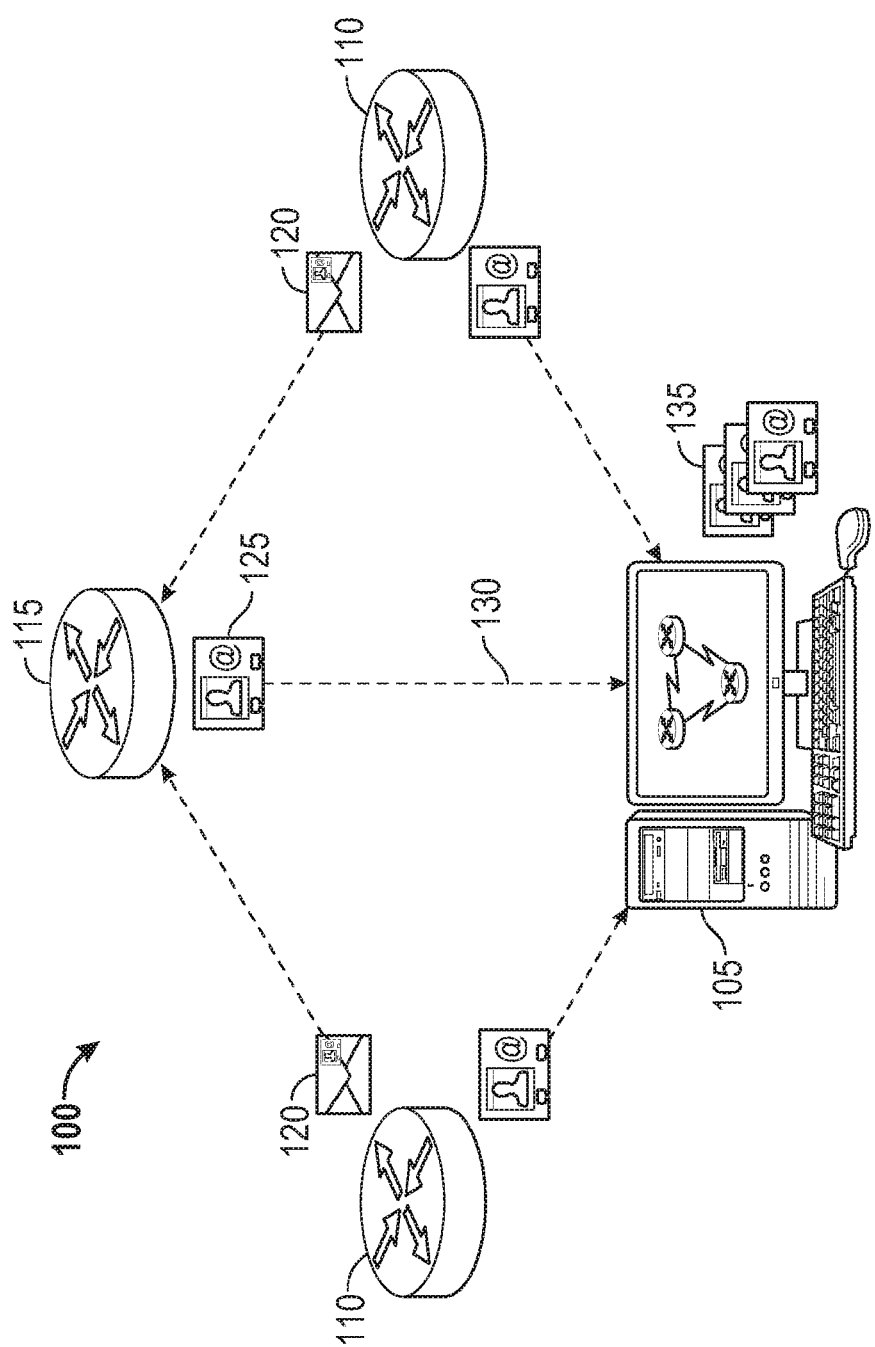
FIG. 1 is one example of an operating environment configured to provide network device registration.

Consistent with embodiments of the disclosure, a network device may connect to a smart-enabled network. Once connected, the network device may receive a network address for a network management server (NMS). Having the network address for the NMS, the network device may generate a Virtual Card (vCard) comprising the attributes necessary for registering with the NMS. The network device may then communicate the vCard to the NMS.

Consistent with embodiments of the disclosure, once the NMS receives the vCard, it may parse the vCard for its device attributes. Using these device attributes, the NMS may identify and register the network device. The registered network device may then be added to a directory of network devices registered to the network.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Consistent with embodiments of the disclosure, a network may be designed to proactively provide information to a centralized network management system (NMS) or smart collector (either of which may be referred to as a 'centralized server') anytime a new network device connects to the network. In this network, the devices already connected to the network may be configured to provide the newly connected network devices with, for example, location information for the centralized server as well additional network information. The additional network information may comprise, but is not limited to, for example, contract and administrative contact information. Using this information, the newly connected network devices may communicate with the centralized server and exchange certain credentials. In various embodiments of the disclosure, these credentials may be included in a Virtual Card (vCard) generated by the newly connected network device. A vCard may comprise, but is not limited to, for example any electronic file that includes data regarding a network device.

Consistent with these embodiments, the vCard sent by the newly connected devices to the centralized server may comprise, but not be limited to, various device attributes, basic asset, and identity details. The vCard may also comprise the credentials needed to do richer management operations for the device. This information is transferred securely and retransmitted by the device when and if the device's credentials are updated.

Once the centralized server received the newly connected device's credential information (e.g., the vCard), it may, for example, identify the network device and add the network device to a directory comprising an inventory of network devices. In various embodiments, the centralized server may, using the credentials received from the newly connected network device, register and manage the network device. In this way, the conventional processes of network device identification, discovery, and management are simplified.

FIG. 1 shows an illustrative network 100 that is consistent with embodiments of the disclosure. Other network configurations operative to perform the network operations disclosed herein may be compatible with the embodiments of the disclosure. Network 100 may be a "Smart"-enabled networked comprising a centralized server 105, existing network devices 110, and newly connected network device 115. As mentioned above, centralized server 105 may comprise, but not be limited to, for example, smart collectors or at least one traditional on-premises NMS.

Communication between network devices 110 and 115 and centralized server 105 should occur using a secure protocol 135 (represented by a solid line), such as, for example, HTTPS, XMPP, and the like, should be used, as credential data will be shared. Network devices 110 may be provisioned with location information 120 comprising, for example, a uniform resource locator (URL) or multiple URLs, for connecting to centralized server 105. In various embodiments, the provisioning can be manual (i.e., part of the traditional configuration) or it can be more dynamic by means of, for example, a DHCP option coupled with other automated policy/configuration servers that may exist in network 100.

Once provisioned with location information 120, network devices 110 may generate a device-level vCard 125 consisting of identity and asset tracking information corresponding to network devices 110. Some of this information may be determined dynamically, while other information may be provisioned onto network device 110. An example device-level vCard (in RFC 6351 xCard format) is provided in FIG. 4. Though FIG. 4 illustrates a vCard in RFC 6351 format, other formats may be used The base device-level vCard 125 may be extended with any number of attributes to enrich the standard set of management features provided by the NMS or Smart Service (in case of the smart collector acting as centralized server 105), as well as enhanced with attributes useful for humans when building their device-level contact list. With the xCard format, the identity and asset data can be easily inserted into existing, secure management protocols such as HTTPS and XMPP. Furthermore, with the standardization efforts of a base device-level vCard, management of disparate vendors' devices is much easier. In this way, devices can share common identity and asset data, beyond what is defined in SNMP.

Once the vCard 125 is generated, network devices 110 may contact centralized server 105 using location information 120 and transmit vCard 125. Upon receipt, centralized server 105 may parse vCard 125 and extract the data necessary to identify and manage network devices 110. Centralized server 105 may also employ vCard 125 in constructing a comprehensive directory 135 and inventory listing of all network devices connected to network 100. Once centralized server 105 registers (i.e., identifies) network devices 110, it may then contact network devices 110 using traditional network management protocols in order to build the overall management model. Since vCard 125 may contain richer identity information (e.g., contact information, location information, and the like), centralized server 105 may further extract this information to enrich the management model created for network devices 110.

In various embodiments of the disclosure, centralized server 105 may choose to send a notification to an administrative contact indicating that network devices have been registered, along with a copy of vCard 125. The notification may be, for example, an email, phone call with automated response, FAX, or any combination thereof. The administrative contact may be specified by the provisioned location information 120, or it may be available within vCard 125. The administrative contact may then be enabled to use the notification and vCard 125 to construct a device-level set of "contacts" for each device in network 100. This can be helpful when needing to replace devices or get support from a vendor.

When newly connected device 115 connects to network 100, it may not know the location of centralized server 105. Thus, in accordance with embodiments of the disclosure, network devices 110 may be configured to transmit location information 120 as well as any additional network-level vCard parameters (e.g., administrative contact, support contract, etc.) to newly connected device 115. Newly connected device 115 may then construct its vCard 125, register with centralized server 105, and notify the administrative contact just as network devices 110 had done.

If any of the vCard parameters change on any device in network 100, the corresponding device may re-register with centralized server 105 and notify the administrative contact. For example, if a device's credentials change, the device may proactively notify centralized server 105 so that centralized server 105 can update its directory 135 and continue to manage it. If any of the cascaded parameters change (e.g., location information), then that information is cascaded through network 100 and all devices will re-register with centralized server 105.

Figure 2:
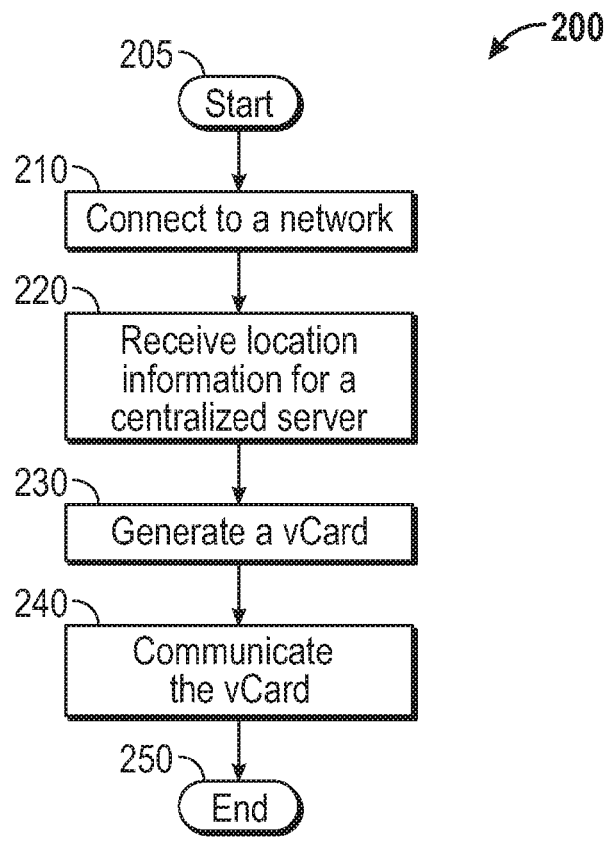
FIG. 2 is one example of a method for providing network device registration.

FIG. 2 is a flow chart setting forth the general stages involved in a method 200 consistent with an embodiment of the disclosure. Method 200 may be implemented using network device 110 and/or 115. Network devices 110 and 115 are described in more detail below with respect to FIG. 3. Ways to implement the stages of method 200 will be described with reference to network device 115 for illustrative purposes, though either network devices 110 or 115 may be implemented.

Method 200 may begin at starting block 205 and proceed to stage 210 where network device 115 may connect to network 100. Network device 115 may interface with network 100 using a secured channel and protocol, such as protocol 130. In order to be operative within network 100, network device 115 may need to register with centralized server 105 and receive the proper configurations for operation within network 100. Similarly, centralized server 105 may need to know the existence of newly connected network device 115 in order to, for example, register network device 115, update its directory 135 of network devices, and manage network device 115, among other administrative and management network tasks. However, when network device 115 initially connects to network 100, it may not be able to communicate with centralized server 105 at least because neither the network device 115 nor centralized server 105 are aware of each other's location, attributes, or credentials.

From stage 210, where network device 115 connects to network 100, method 200 may advance to stage 220 where network device 115 may receive location information 120 for centralized server 105. Though network device 115 may not initially be able to locate centralized server 105 for registration, it may locate neighboring network devices 110. In this way, network devices 110 and 115 may establish, for example, a peer-to-peer connection without involving centralized server 105. Through this peer-to-peer connection, network devices 110 may communicate to newly connected network device 115 location information 120. Alternatively, network device 115 may establish a connection with a configuration server that may, in turn, provide network device 115 with location information 120. As mentioned above, location information 120 may include a URL, a network address, or any other contact information for centralized server 105.

In addition to location information 120, network device 115 may also be provided with additional asset information. For example, contract details and administrative contact information may be provided to network device 115. With this additional asset information, network device 115 may be enabled to generate and communicate, for example, a more detailed vCard 125 tailored to network 100.

Once network device 115 receives location information 120 in stage 220, method 200 may continue to stage 230 where network device 115 may generate vCard 125. Having location information 120, network device 115 may now register with centralized server 105. To register, however, network device 115 may need to communicate its attributes to centralized server 105. These attributes may be included in vCard 125, as discussed above.

Network device 115 may detail its device credentials in vCard 125, including, for example, a device serial number, a device operating platform, software version, and the like. In addition, network device 115 may details its geographical information in vCard 125, such as its locality within a networking infrastructure and the infrastructure's address. It may also provide administrative contact information for an administrator of network device 115. For example, vCard 125 may be generated to include a contact email, a telephone number, and a contract number used in the administration of network device 115.

After network device 115 generates vCard 125 in stage 230, method 200 may proceed to stage 240 where network device 115 may communicate vCard 125 to centralized server 105. With vCard 125, centralized server 105 may be enabled to, for example, identify the newly connected network device 115, register it, add it to a directory 135, and manage the device 115 in accordance with various embodiments of the disclosure. Furthermore, centralized server may be further configured to communicate vCard 125 to a network administrator, notifying the administrator that newly connected network device 115 has been registered. Once network device 115 communicates vCard 125 in stage 240, method 200 may then end at stage 250.

An embodiment consistent with the disclosure may comprise an apparatus for performing a method of the present disclosure. The apparatus may comprise a memory storage and a processing unit coupled to the memory storage. The processing unit may be operative to connect to a network; receive a network address for a network management server (NMS); generate a vCard comprising identity attributes necessary for registering with the NMS; and communicate the vCard to the NMS.

Yet another embodiment consistent with the disclosure may comprise an apparatus for performing yet another method of the present disclosure. The apparatus may comprise a memory storage and a processing unit coupled to the memory storage. The processing unit may be operative to receive an indication that a network device has connected to a network; provide, to the network device, a network address for a server; exchange device attributes between the network device and the server; and register the network device to the network according to the device attributes.

Another embodiment consistent with the disclosure may comprise a system. The system may comprise at least one NMS configured to: register at least one network device in a network, add the at least one network device to a directory, and manage the at least one network device in the network; and a network device in communication with the NMS, the network device being configured to: connect to the network, receive a network address for the NMS from at least one of the following: at least one existing network device, a configuration server, and the NMS, generate a vCard comprising attributes necessary for enabling registration with the NMS, communicate the vCard to the NMS, receive an indication of a new network device connected to the network, and broadcast the network address for the NMS to the new network device.

Another embodiment consistent with the disclosure may comprise another apparatus. The apparatus may comprise a memory storage; and a processing unit coupled to the memory storage, the processing unit being configured to: receive an indication that a network device has connected to a network; provide the network device with a network address for receiving device attributes; receive the device attributes from the network device; and register, using the device attributes, the network device to the network.

Figure 3:
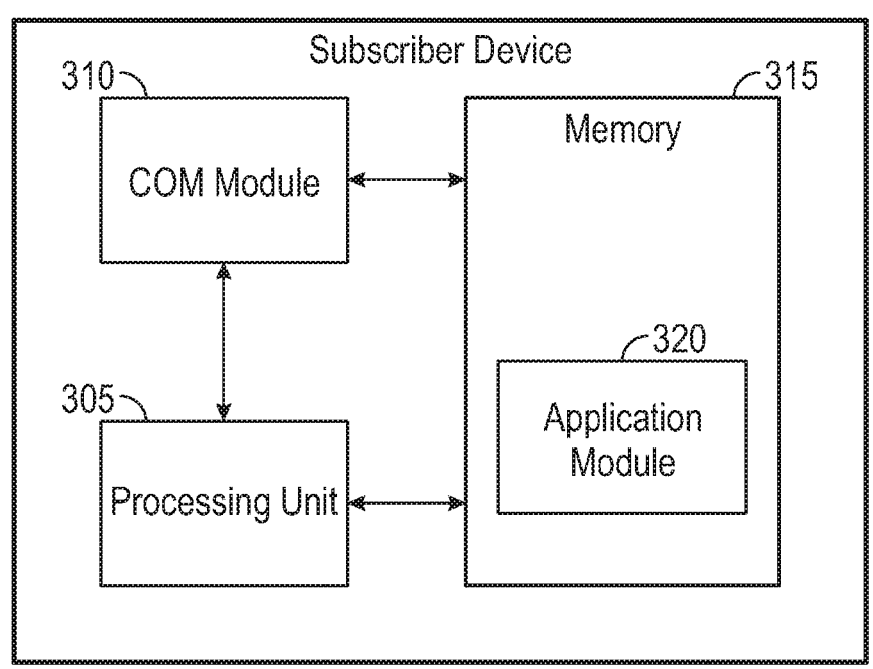
FIG. 3 is one example of a network device.

FIG. 3 is a block diagram of a network device 300. Network device 300 may be a computing device or any other type of networking device, such as network devices 110 and 115. Network device 300 may comprise, for example, an operating environment for network devices 110 and 115. Network device 300 may comprise a processing unit 305 operatively tied to a communication module 310, and a memory 315. Communication module 210 may provide communications between network device 300 and centralized server 105 over, for example, network 100 in a distributed computing environment. By way of example, and not limitation, communication processes interfacing with communication module 310 may include wired processes such as a wired network or direct-wired connection, and wireless processes such as acoustic, radio frequency (RF), infrared, and other wireless media.

Memory 315 may comprise any computer storage media, such as volatile and nonvolatile, removable and non-removable media implemented in any method or technology for storage of information, such as computer readable instructions, data structures, program modules, or other data. Computer storage media may include, but is not limited to, random access memory (RAM), read only memory (ROM), electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by subscriber device 200. Any such computer storage media may be part of network device 300. The term computer readable media as used herein may include both storage media and communication media.

Memory 315 may store, for example, an operating system and one or more programming modules. The operating system, for example, may be suitable for controlling network device 300's operation. Furthermore, memory 315 of network device 300 may comprise an application module 320. Application module 320 may be operative to enable network device 300 to receive and read location information 120, generate vCard 125, and cause a communication of vCard 125.

Moreover, while executing on processing unit 305, application module 320 may perform processes for providing multimedia content communication, including for example, one or more stages from method 200 described with respect to FIG. 2. Though network device 300 is shown to have the aforementioned components, other components may be included in network device 300 such as input/output components, display components, and other components.

Embodiments of the disclosure, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
   a memory storage; and
   a processing unit coupled to the memory storage, the processing unit being configured to:
   receive a vCard comprising device attributes from a newly connected network device;
   register, using the device attributes included in the vCard, the network device to a network; and
   add the network device to a directory comprising a listing of network devices registered to the network, wherein the network is configured to cause at least one existing network device to forward, to the newly connected network device, location information for a device configured to receive the vCard.

2. The apparatus of claim 1, wherein the processing unit is further configured to cascade updated location information for the device configured to receive the vCard when the location information for the device has changed.

3. The apparatus of claim 1, wherein the device configured to receive the vCard comprises one of the following: a network management server (NMS) and a smart collector.

4. The apparatus of claim 1, wherein the processing unit being configured to receive the vCard comprising the device attributes from the newly connected network device comprises the processing unit being configured to receive the vCard generated by the network device, the vCard comprising the device attributes necessary for the processing unit to perform at least one of the following: identify the network device, register the network device, inventory the network device, add the network device to the directory, and manage the network device.

5. The apparatus of claim 1, wherein the processing unit is further configured to notify an administrative contact once the network device is registered to the network.

6. The apparatus of claim 1, wherein the processing unit is further configured to update the directory with new device attributes when updated device attributes for the network device have been received.

7. An apparatus comprising:
   a memory storage; and
   a processing unit coupled to the memory storage, the processing unit being configured to:
   connect to a network,
   receive a network address for a network management server (NMS) from at least one of the following: at least one existing network device, a configuration server, and the NMS,
   generate a vCard comprising attributes necessary for enabling registration with the NMS,
   communicate the vCard to the NMS,
   receive an indication of a new network device connected to the network, and
   broadcast the network address for the NMS to the new network device.

8. The apparatus of claim 7, wherein the processing unit is further configured to: receive contact information for an administrator, and communicate the vCard to the administrator.

9. The apparatus of claim 7, wherein the processing unit is further configured to cascade an updated network address for receiving the device attributes through the network when the network address has changed.

10. The apparatus of claim 7, wherein the processing unit is further configured to update the NMS with new device attributes when the device attributes for the apparatus have changed.

11. A method comprising:
    receiving a vCard comprising device attributes from a newly connected network device;
    registering, using the device attributes included in the vCard, the network device to a network; and
    adding the network device to a directory comprising a listing of network devices registered to the network, wherein the network is configured to cause at least one existing network device to forward, to the newly connected network device, location information for a device configured to receive the vCard.

12. The method of claim 11, further comprising cascading updated location information for the device configured to receive the vCard when the location information for the device has changed.

13. The method of claim 11, wherein receiving the vCard comprising the device attributes from the newly connected network device comprises receiving the vCard generated by the network device, the vCard comprising the device attributes necessary to perform at least one of the following: identify the network device, register the network device, inventory the network device, add the network device to the directory, and manage the network device.

14. The method of claim 11, further comprising notifying an administrative contact once the network device is registered to the network.

15. The method of claim 11, further comprising updating the directory with new device attributes when updated device attributes for the network device have been received.

16. A method comprising:
    connecting to a network;
    receiving a network address for a network management server (NMS) from at least one of the following: at least one existing network device, a configuration server, and the NMS;

generating a vCard comprising attributes necessary for enabling registration with the NMS;

communicating the vCard to the NMS;

receiving an indication of a new network device connected to the network; and broadcasting the network address for the NMS to the new network device.

17. The method of claim 16, further comprising:

receiving contact information for an administrator, and communicating the vCard to the administrator.

18. The method of claim 16, further comprising cascading an updated network address for receiving the device attributes through the network when the network address has changed.

19. The method of claim 16, further comprising updating the NMS with new device attributes when the device attributes for the apparatus have changed.

* * * * *